US012793122B2

(12) United States Patent
Shin

(10) Patent No.: US 12,793,122 B2
(45) Date of Patent: Nov. 10, 2026

(54) VISUAL ATTENTION-BASED SURFACING USING INFERRED HEAD POSE WITH PRODUCT LOCATIONS

(71) Applicant: Google LLC, Mountain View, CA (US)

(72) Inventor: Dongeek Shin, San Jose, CA (US)

(73) Assignee: Google LLC, Mountain View, CA (US)

( * ) Notice: Subject to any disclaimer, the term of this patent is extended or adjusted under 35 U.S.C. 154(b) by 93 days.

(21) Appl. No.: 18/565,363

(22) PCT Filed: Dec. 29, 2022

(86) PCT No.: PCT/US2022/082560
§ 371 (c)(1),
(2) Date: Nov. 29, 2023

(87) PCT Pub. No.: WO2024/144807
PCT Pub. Date: Jul. 4, 2024

(65) Prior Publication Data
US 2025/0054052 A1 Feb. 13, 2025

(51) Int. Cl.
*G06Q 30/00* (2023.01)
*G06Q 30/0251* (2023.01)
(Continued)

(52) U.S. Cl.
CPC ..... *G06Q 30/0639* (2013.01); *G06Q 30/0255* (2013.01); *H04W 4/026* (2013.01); *H04W 4/38* (2018.02)

(58) Field of Classification Search
CPC . G06Q 30/0639; G06Q 30/0255; H04W 4/38; H04W 4/026
See application file for complete search history.

(56) References Cited

U.S. PATENT DOCUMENTS 10,555,106 B1 2/2020 Mehra
10,638,250 B2 4/2020 Hammerschmidt
(Continued)

FOREIGN PATENT DOCUMENTS

CN 106575153 A 4/2017
CN 113711620 A 11/2021

OTHER PUBLICATIONS

Echterhoff, Jessica Maria, and Edward J. Wang. "Par: Personal activity radius camera view for contextual sensing." arXiv preprint arXiv:2008.07204 (2020). (Year: 2008).*
(Continued)

*Primary Examiner* — Anand Loharikar
(74) *Attorney, Agent, or Firm* — Lerner David LLP

(57) ABSTRACT

Systems (312) and methods (400) are provided for passively collecting context data associated with in-store shopping by a user. In this regard, one or more processors (202, 204) may receive, from each earbud in a pair of earbuds (238) worn by a user, sensor data corresponding to an orientation of each respective earbud (240, 242). Based on the received sensor data, the one or more processors (202, 204) may determine the gaze directions of the user as the user travels within a store and one or more products viewed by the user while traveling within the store by comparing, using a content map (128) of the store, the gaze directions of the user to product locations storing products, wherein the one or more products are the context data.

16 Claims, 9 Drawing Sheets

(51) Int. Cl.

| | |
|---|---|
| ***G06Q 30/0601*** | (2023.01) |
| ***H04W 4/02*** | (2018.01) |
| ***H04W 4/38*** | (2018.01) |

(56) References Cited

U.S. PATENT DOCUMENTS

| | | | | |
|---|---|---|---|---|
| 2019/0244386 | A1 | 8/2019 | Fisher et al. | |
| 2020/0145757 | A1 | 5/2020 | Kraemer et al. | |
| 2021/0341292 | A1* | 11/2021 | Zhu | H04B 17/318 |
| 2021/0377648 | A1* | 12/2021 | Tome | H04R 1/1016 |
| 2022/0044302 | A1 | 2/2022 | Rakshit | |

OTHER PUBLICATIONS

International Search Report and Written Opinion for International Application No. PCT/US2022/082560 dated Jun. 22, 2023. 12 pages.

Office Action for Chinese Patent Application No. 202280042443.X dated Jun. 17, 2025. 8 pages.

First Examination Report for Indian Patent Application No. 202317082517 dated Apr. 10, 2026. 7 pages.

* cited by examiner

VISUAL ATTENTION-BASED SURFACING USING INFERRED HEAD POSE WITH PRODUCT LOCATIONS

BACKGROUND

Contextual advertising is a form of personalized advertising where advertisements ("ads") are selected based on context data associated with the individual the advertising is directed to. Context typically includes the individual's location, search history, browsing history, or other such information associated with the individual. For example, if an individual is browsing an online store for a pair of sneakers, a contextual ad for a particular sneaker or sneaker brand may be displayed in the user's browser. In another example, if the individual submits a search query for a particular car model, a contextual ad for a competing car model may be returned to the individual. Contextual advertisements are typically more relevant and interesting to the individuals that receive them than general advertisements directed to large audiences and typically result in more successful advertising performance.

In-store shopping presents additional opportunities to collect context data for use in contextual advertising. For example, the products an individual views while moving through a store may be context data that indicates the types of products the individual is interested in. However, to collect this context data, the individual may be required to actively take action. For instance, the individual may perform a visual search for products captured by their smartphone camera while shopping in the store. The products within the visual search may provide context data to the store or others that can be leveraged to provide contextual ads. For instance, in response to a visual search for a particular brand's laundry detergent, the store may provide a contextual ad for a competing brand's laundry detergent.

BRIEF SUMMARY

The technology described herein is directed to passively correlating a user's gaze with in-store content for determining context data. One aspect of the disclosure is directed to a method for passively collecting context data, the method comprising: receiving, by one or more processors, from each earbud in a pair of earbuds worn by a user, sensor data corresponding to an orientation of each respective earbud; determining, by the one or more processors, based on the received sensor data, gaze directions of the user as the user travels within a facility; and determining, by the one or more processors, one or more products viewed by the user while traveling within the facility by comparing, using a content map of the facility, the gaze directions of the user to product locations storing products, wherein the one or more products are the context data.

In some examples location data of the user as the user travels within the facility is received by the one or more processors. In some instances, the location data includes GPS data, indoor navigation system data, and/or positional data contained within the sensor data.

In some examples, comparing the gaze directions of the user to the product locations comprises: for each gaze direction: determining, from the location data, a location of the user when the gaze direction was determined; and determining whether a ray from the location of the user in the gaze direction intersects a product location of the product locations. In some examples, the one or more products are the products stored at product locations the respective rays intersect.

In some instances, the product locations include sub-product locations.

In some examples, the sensor data from each earbud includes data captured by one or more accelerometers and gyroscopes.

In some instances, the one or more processors receive a signal from an initiation device, wherein the signal initiates collection of the sensor data by the pair of earbuds. In some examples, the one or more processors receive data from an RFID tag indicating the user has entered the facility; and initiate collection of the sensor data by the pair of earbuds.

In some examples, for each gaze direction, the one or more processors, determine a length of time the user maintained the respective gaze direction.

In some instances, the one or more processors are within at least one of the earbuds of the pair of earbuds.

In some instances, the one or more processors are within a user device.

Another aspect of the disclosure is directed to a system comprising: one or more processors; and a memory storing instructions that, when executed by the one or more processors, cause the one or more processors to: receive, from each earbud in a pair of earbuds worn by a user, sensor data corresponding to an orientation of each respective earbud; determine, based on the received sensor data, gaze directions of the user as the user travels within a facility; and determine, one or more products viewed by the user while traveling within the facility by comparing, using a content map of the facility, the gaze directions of the user to product locations storing products, wherein the one or more products are the context data.

In some instances, the one or more processors further receive location data of the user as the user travels within the facility.

In some examples, the location data includes GPS data, indoor navigation system data, and/or positional data contained within the sensor data.

In some examples, comparing the gaze directions of the user to the product locations comprises: for each gaze direction: determining, from the location data, a location of the user when the gaze direction was determined; and determining whether a ray from the location of the user in the gaze direction intersects a product location of the product locations.

In some instances, the one or more products are the products stored at product locations the respective rays intersect, wherein the product locations include sub-product locations.

In some instances, the sensor data from each earbud includes data captured by one or more accelerometers and gyroscopes.

In some examples, the system further includes the pair of earbuds.

Another aspect of the disclosure is directed to a computer-readable storage medium, the computer-readable storage medium including instructions that when executed by a computer, cause the computer to carry out the method.

BRIEF DESCRIPTION OF THE DRAWINGS

A more complete appreciation of the subject matter of the present technology and the various advantages thereof may be realized by reference to the following detailed description which refers to the accompanying drawings, in which.

DETAILED DESCRIPTION

Overview

Figure 1:
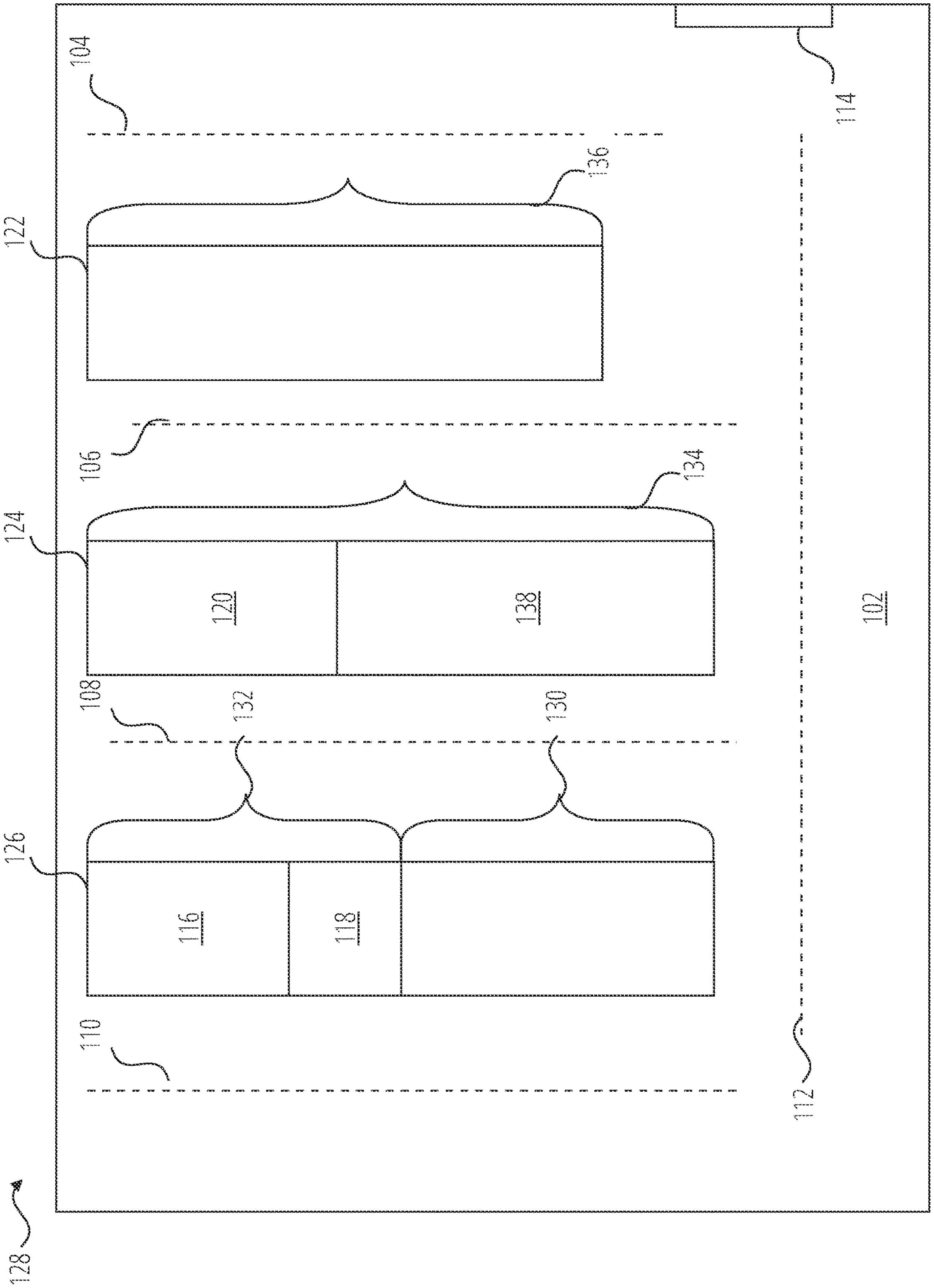
FIG. 1 illustrates an example illustration of a content map in accordance with aspects of the disclosure.

The technology described herein relates to passively collecting context data associated with a user's in-store shopping experience or travel within another facility for use in contextual advertising, planning product layouts and placements, store design, etc. For instance, as a user moves within a store, the location and gaze direction of the user may be inferred and compared to a content map of the store. The content map may include product locations corresponding to where products are positioned within the store. By comparing the inferred gaze direction and location of the user to the content map of the store, a determination of what products the user looked at during their in-store shopping experience may be determined. Based on the determination of products the user looked at, context data corresponding to the user's in-store shopping experience may be generated.

As described in more detail herein, the gaze direction of the user may be determined using sensor data provided by sensors within a pair of earbuds or other such wearables worn by the user. For example, each earbud of a pair of earbuds may include an Inertial Measurement Unit (IMU) that provides sensor data, including accelerometer and gyroscopic data from which a respective frame of reference for each earbud may be determined. Each earbud is worn in a respective ear of the user and may be considered attached to the same rigid frame—the user's head. In this regard, the earbuds are "head-locked" in the sense that the movement of the earbuds and the movement of the user's head are closely correlated. Moreover, given the respective frames of reference for each earbud and their positions in ears on opposite sides of the user's head, the orientation of the user's head may be inferred from the sensor data. The head orientation may be used as a proxy for understanding where the user is looking. Stated another way, the user's head orientation may provide an indication as to the direction the user's gaze is focused. Accordingly, by analyzing the movements of the earbuds using the IMUs, the orientation of the user's head may be inferred over the course of their visit to the store, from which the gaze direction of the user over the course of their visit to the store may be estimated.

The user's location throughout the store may also be determined. For example, the user's device, such as a smartphone may include GPS or other such location systems. The GPS may be used to provide location data corresponding to the location of the user as they traverse the store. As stores are typically located indoors, GPS signals may be weak or nonexistent and may result in missing or inaccurate location data. To address this issue, location data may include positional data contained within sensor data provided by the IMU's. This positional data may be used to detect the user's location within the store. Additionally, or alternatively, a store may include an indoor navigation system that is capable of providing location data corresponding to a user. Such an indoor navigation system may improve the accuracy of the location data when compared to typical location data provided by GPS systems and the positional data provided by the IMUs.

The user's location and gaze direction may begin to be analyzed upon the user entering or nearing entry of the store. For instance, as a user nears a store's entryway, a sensor, such as an RFID tag or Bluetooth device, may trigger data collection to begin. Data collection may include collecting the sensor data to determine the user's gaze direction and/or location. Data collection may also include collecting location data from location systems and/or the positional data contained within the sensor data.

The user's location and gaze direction may be compared to a content map of the store to identify which products the user viewed while within the store. In this regard, the content map may define the layout of the store and the product locations within the store. Thus, by comparing the product locations on the content map to the location and gaze direction of the user over the course of a visit to the store, determinations as to which products the user viewed while within the store may be made. For example, an intersecting ray result may be determined by generating a ray from the user's location in the direction of the determined gaze direction. The product stored at the product location intersected by the ray may be determined to be a product the user viewed.

In some instances, a determination of what product the user is looking at may be made in real-time. In this regard, the location and gaze direction of the user may be continually determined and compared to the product locations on the content map to identify which product, if any, the user is currently viewing.

In some examples, the amount of time a user viewed a product may also be determined by identifying the length of time the user's gaze was directed at the product location associated with that product. The viewed products and the length of time the user viewed the products may be considered context data.

The amount of time a user viewed a product and the spatial distribution around the product locations in the content map may be used to generate attention scores indicative of the user's interest in the product at the product location. In this regard, a machine learning model, such as a neural network, may be trained to generate attention scores based on the spatial distribution around the product locations viewed by the user and the duration the user viewed these locations.

Content Maps

Content maps discretize the product locations of different types of products, such as physical goods or materials (e.g., promotional displays, signage, advertisements, etc.) throughout a facility, such as a store, warehouse, market, or other such locations where products are arranged. For clarity and case of reference, "products," as used herein, may be considered any physical good or material. For example, a clothing store's content map may include discretized product locations for jeans, shirts, socks, etc. Each discretized product location may include sub-product locations to differentiate the product locations of different brands, sizes, models, versions, etc., of a product. For instance, a product location for jeans may be sub-divided into sub-product locations for each brand of jeans offered by the store. Moreover, although the examples described herein refer to stores, any other facility may be used.

Sub-product locations may provide a higher resolution analysis of what products the user was looking at during their visit to the store. For instance, using the techniques described herein, if a store has a content map with a "jeans" product location that is sub-divided into sub-product locations for each brand of jeans offered by the store, the store can learn which jean brands attract the most views, and conversely, the jean brands that fail to attract views. In instances where products of the same or similar type are stored in different areas of the store, sub-dividing product locations within the content map may not be necessary, as the spatial distance between the same or similar products may be sufficient to allow for proper identification using the techniques described herein.

Based on the collected and determined information, such as the product(s) viewed by the user, user location data, gaze direction, etc., the store can better manage inventory, display/product locations, target advertisements, and provide more targeted offers. For instance, if a brand of jeans is not attracting interest from users, the store may provide advertisements or offers for that brand of jeans to move inventory. Content maps may be created by a store owner, employee, or any other third-party, such as a content map creator. Content maps may be created using content map creation software or any other software capable of defining the layout of product locations within a store. Product maps may be updated as product locations are changed, new products are added, products are removed, etc., from the store.

An example content map 128, illustrating product locations within store 102 is illustrated in FIG. 1. As shown, content map 128 shows shelving units that hold products, including shelf 1 122, shelf 2 124, and shelf 3 126. Content map 128 also includes aisles where a user can walk to view shelving, including aisle 1 104, aisle 2 106, aisle 3 108, aisle 4 110, and aisle 5 112. Content map 128 further includes an entryway, doorway 114, through which a user may enter the store 102.

During the creation of content map 128, products may be associated with each shelf and/or a portion of each shelf to generate product locations. Continuing the clothing store example, shelf 1 122 may be associated with shirts to create product location 136 and shelf 2 124 may be associated with pants to create product location 134. Shelf 3 126 may be split, with each portion being assigned a different product. For instance, socks may be associated with product location 130 and suits may be associated with product location 132. As such, content map 128 includes four product locations, including product location 136 for shirts (covering all of shelf 1 122), product location 134 for pants (covering all of shelf 2 124), product location 130 for socks (covering product the lower half of shelf 3 126), and product location 132 for suits (covering the upper half of shelf 3 126.)

As further illustrated in FIG. 1, product location 134 for pants on shelf 2 124 may be split into sub-product locations, including sub-product location 120 and sub-product location 138. Each sub-product location may be associated with a particular brand of pants, size of pants, or any other distinguishing feature or identifier. Likewise, the product location covering product location 132 of shelf 3 126 may be split into sub-product locations, including sub-product location 116 and sub-product location 118. In addition, sub-product location 116 and sub-product location 118 may be associated with distinguishing features or identifiers, such as suit sizes or colors.

Although not illustrated, content maps may include spatial data corresponding to the relative locations and/or distances of the product locations from an entryway. For instance, the spatial data of the product locations and sub-product locations in content map 128 relative to doorway 114 may be stored with or in association with content map 128.

Although content map 128 illustrates the discretizing of product locations on shelving, a content map may discretize product locations at any location within a store, including products on tables or other structures, within containers or display cases, etc. In some instances, a product location may correspond to a product or products positioned on the floor of the store. Moreover, a content map may include any number of product locations, entry points, aisles, etc.

Example Systems

Figure 2:
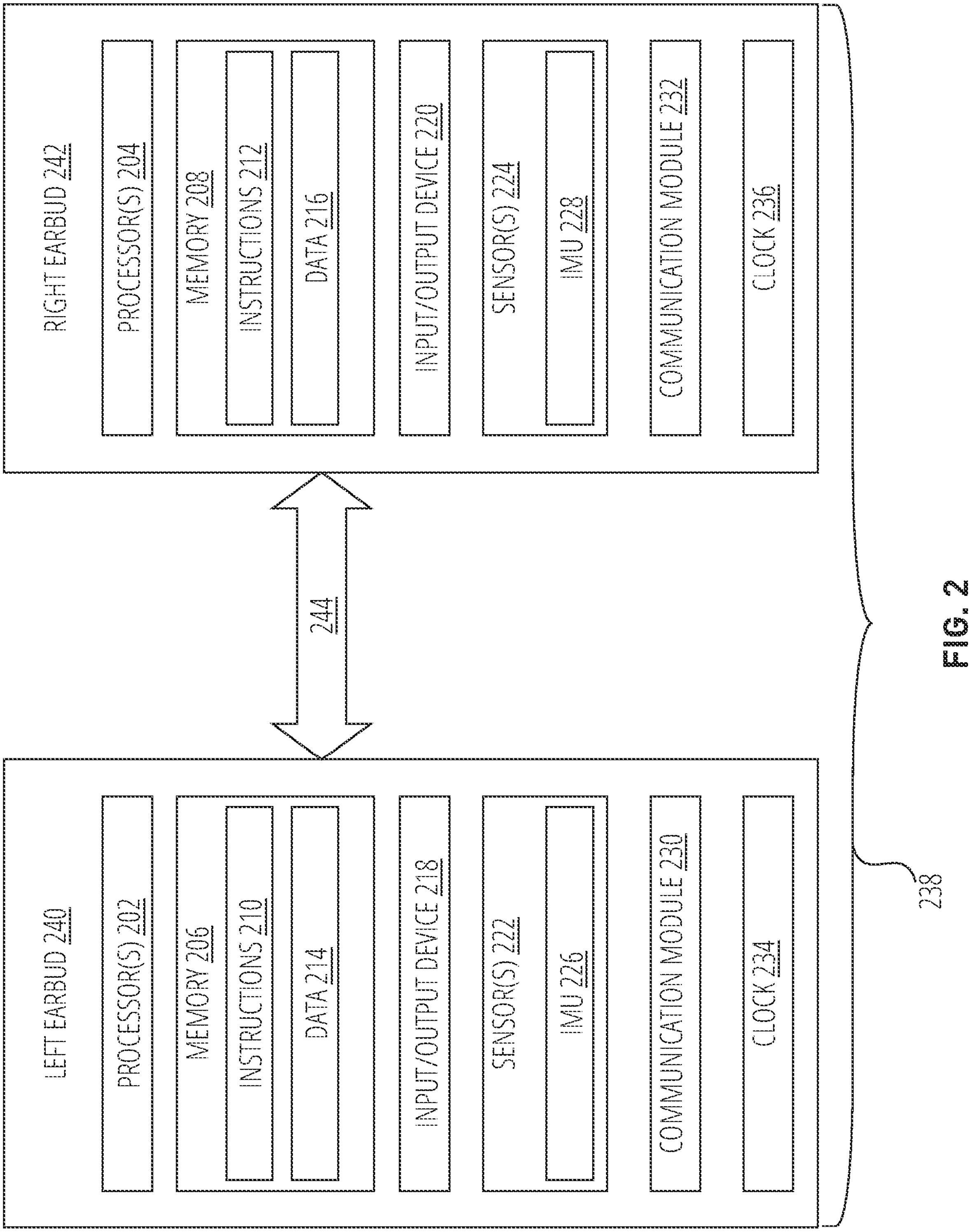
FIG. 2 is a pictorial diagram illustrating the example pair of earbuds in accordance with aspects of the disclosure.

FIG. 2 is a functional block diagram of a pair of earbuds 238, including left earbud 240 and right earbud 242 in which techniques described herein may be implemented. It should not be considered as limiting the scope of the disclosure or usefulness of the features described herein. For example, and as shown in FIG. 2, the left earbud 240 may contain one or more processors 202, memory 206 and other components typically present in general-purpose computing devices. The right earbud 242 may similarly contain one or more processors 204, memory 208, and other components typically present in general-purpose computing devices. In some examples, the processors 202 and 204, and memory 206 and 208 may be part of a microcontroller unit ("MCU").

Memory 206, 208 may store information accessible by the one or more processors 202 and 204, including instructions 210, 212, that can be executed by the one or more processors. Memory 206, 208 can also include data 214, 216 that can be retrieved, manipulated, stored, etc., by the processors 202 and 204. The memory can be of any type capable of storing information accessible by the processor, such as a hard-drive, memory card, ROM, RAM, DVD, CD-ROM, write-capable, and read-only memories. The memory may be considered to be a non-transitory memory.

The instructions 206, 212 can be any set of instructions to be executed directly, such as machine code, or indirectly, such as scripts, by the one or more processors. In that regard, the terms "instructions," "application(s)," "step(s)" and "program(s)" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below. For instance, instructions may include a store application.

Data 214, 216 can be retrieved, stored, modified, etc., by the one or more processors 202, 204 in accordance with the instructions 210, 212. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data. Data may also include sensor data and location data, as described herein.

The one or more processors 202, 204 can be any conventional processors, such as a commercially available CPU. Alternatively, the processors can be dedicated components such as an application specific integrated circuit ("ASIC") or other hardware-based processors. Although not necessary, the pair of earbuds 238 may include specialized hardware components to perform specific computing processes, such as processing machine learning algorithms, processing audio, etc., faster or more efficiently.

Although FIG. 2 functionally illustrates the processors, memory, and other elements of the pair of earbuds 238 as being within the same block, the processors, memory, and other elements can actually comprise multiple processors, computers, computing devices, or memories that may or may not be stored within the same physical housing. For example, the memory can be a hard drive or other storage media located in housings different from that of the left earbud 240 and right earbud 242. Accordingly, references to a processor, computer, computing device, or memory will be understood to include references to a collection of processors, computers, computing devices, or memories that may or may not operate in parallel.

As further shown in FIG. 2, the left earbud 240 and right earbud 242 may each include one or more input/output devices 218, 220, respectively. Input/output devices 218, 220, may include, for instance, one or more speakers, transducers or other audio outputs, a user display, a haptic interface or other tactile feedback that provides non-visual and non-audible information to the user, keypads, keyboards, mouse, touchscreen, etc. For example, output devices 218, 220, may be used to play music, emit audio for navigational or other guidance, for multimedia files, for voice calls, for translated speech, etc.

One or both of left earbud 240 and right earbud 242 may include one or more sensors, such as sensor(s) 222, 224, respectively. For instance, sensor(s) 222, 224 may include motion sensors, such as one or more Inertial Measurement Unit(s) ("IMU") including IMU 226, 228. According to some examples, the IMU 226 and IMU 228 may each include one or more gyroscope(s) such as a 3-axis gyroscope. The gyroscope may be configured to measure angular motion, such as angular velocity and rotational angle, about x, y, and z-axes. The IMUs 226, 228 may further include one or more accelerometer(s) such as a 3-axis accelerometer. The accelerometer may be configured to measure linear motion, such as linear acceleration, along x, y, and z-axes. The accelerometer may be configured to measure linear motion, such as linear acceleration, along x, y, and z-axes.

In order to obtain information from and send information to each other, as well as to other remote devices, the left earbud 240 and the right earbud 242 may each include a communication module, such as communication modules 230, 232, respectively. The communication modules may enable wireless network connections, wireless ad hoc connections, and/or wired connections. Via the communication modules 230, 232, the pair of earbuds 238 may establish communication links, such as wireless links. The communication modules 230, 232 may be configured to support communication via cellular, LTE, 4G, WiFi, GPS, and other networked architectures. The communication modules 230, 232 may be configured to support Bluetooth®, Bluetooth LE, near-field communications, and non-networked wireless arrangements. The communication modules 230, 232 may support wired connections such as a USB, micro USB, USB type C or other connector, for example to receive data and/or power from a laptop, tablet, smartphone or other device.

Each earbud in the pair of earbuds 238 may include one or more internal clocks 234, 236. The internal clocks may provide timing information, which can be used for time measurement for apps and other programs run by the computing devices described herein and/or the earbuds, and basic operations by the computing devices, sensors, inputs/outputs, GPS, communication system, etc. In some instances, each of the earbuds may include a plurality of clocks. For example, clocks 234, 236 may include one or more clocks in a Bluetooth module or chipset, an IMU clock, and an MCU clock. In some instances, a clock may be configured as a "master clock," and a second clock, such as a clock in the other earbud than the master clock, may be configured as an "estimated clock" that is synchronized to the master clock.

The left earbud 240 may be configured to be worn in a left ear of a user and the right earbud 242 may be configured to be worn in a right ear of a user. The left earbud 240 and the right earbud 242 may be wireless in that they do not require a wired connection for use. For instance, the wireless earbuds may receive signals wirelessly such as from a music player, phone, or other device to perform a number of functions, such as to generate output, to communicate with each other and/or other devices, to be charged, etc. The pair of earbuds 238, including left earbud 240 and right earbud 242, may be truly wireless, in that they also do not require a wired connection in order to communicate with each other. Each earbud may be configured to have physical features, such as ear tips, that allow the earbuds to securely and comfortably fit in the user's left ear and right ear, respectively. In some instances, earbuds may be worn over or on the user's ears. For example, the earbuds may be closed- or open-back headphones that cover or partially cover the user's ears.

Figure 3:
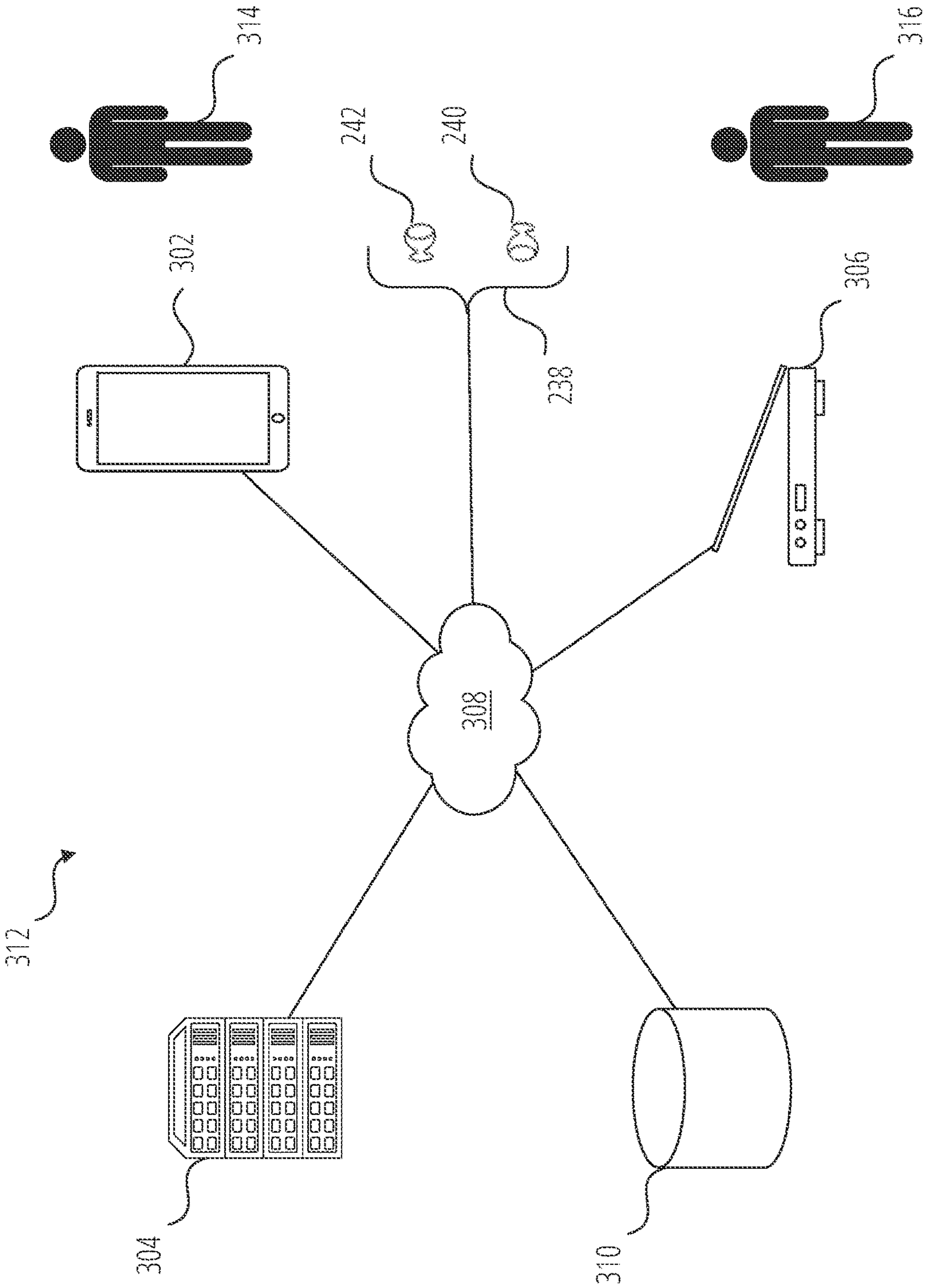
FIG. 3 is a block diagram of an example system including the example pair of earbuds in accordance with aspects of the disclosure.

Using the communication modules 230, 232, the pair of earbuds 238 may communicate with other devices in a system via a network, as described herein with regard to FIG. 3.

FIG. 3 is a pictorial diagram illustrating an example system 312 in which the features described herein may be implemented. The system 312 may include the pair of earbuds 238, including left earbud 240 and right earbud 242, computing devices 302, 304, and 306, and a storage system 310. As shown, the pair of earbuds 238, computing devices 302, 304, and 306, and a storage system 310 can each be at different nodes of a network 308 and capable of directly and indirectly communicating with other nodes of network 308. Although only a few computing devices are depicted in FIG. 3, it should be appreciated that a typical system can include a large number of connected computing devices, with each different computing device being at a different node of the network 308.

The network 308 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Network slicing supports customizing the capacity and capabilities of a network for different services such as geolocation and route planning, sensor monitoring, computer vision, etc. Edge data center processing and local data center processing augments central data center processing to allocate 5G, 6G, and future network resources to enable user devices, including smartphones and wearables, as well as sensors and other wirelessly-connected devices.

Not only can terrestrial network equipment support geolocation, route planning, location identification, sensor monitoring, computer vision, etc., non-terrestrial network equipment such as drones, satellites, and balloons can enable 5G, 6G, and future wireless communications in additional environments such as marine, rural, and other locations that experience inadequate base station coverage.

As support for geolocation, route planning, location identification, sensor monitoring, computer vision, etc., 5G, 6G, and future wireless networks enable fine range sensing and sub-meter precision localization. Leveraging massive bandwidths and wireless resource (time, frequency, space) sharing, these wireless networks enable simultaneous communications and sensing capabilities to support radar applications in user devices, such as smart displays, smartphones, wearables, etc., as well as sensors and other wirelessly-connected devices.

Each of the computing devices 302, 304, and 306 may be configured similarly to the earbuds in the pair of earbuds 238, with one or more processors, memory and instructions as described above. For instance, computing devices 302 and 306 may each be a client device intended for use by a user, such as user 314 or 316, and have all of the components normally used in connection with a personal computing device such as a central processing unit (CPU), memory (e.g., RAM and internal hard drives) storing data and instructions, user inputs and/or outputs, sensors, communication module, positioning system, clock, etc. For example, communication modules of computing devices 302, 306 may similarly include one or more antennas for transmitting and/or receiving signals, such as Bluetooth® signals and/or GPS. As another example, computing devices 302, 306 may have the same and/or different types of user inputs and/or outputs as the earbuds in the pair of earbuds 238, such as a screen or touchscreen for displaying texts, images, videos, etc. Computing user devices 302, 306 may be referred to as "user devices" and/or "mobile devices" herein.

As yet another example, computing device 304 may be a server computer and may have all of the components normally used in connection with a server computer, such as processors, and memory storing data and instructions.

The computing devices 302 and 306 may each comprise a full-sized personal computing device, or may alternatively comprise mobile computing devices capable of wirelessly exchanging data with a server, such as server 304, over a network such as the Internet. For example, computing device 302 may be a mobile device, such as a mobile phone as shown in FIG. 3, or some other mobile device such as a wireless-enabled PDA. As another example, computing device 306 may be a laptop computer as shown in FIG. 3, or some other computing device such as a desktop computer, a tablet, or other smart device that is capable of obtaining information via communication links. In other examples (not shown), system 312 may additionally or alternatively include wearable devices, such as a smartwatch, a head mount device, etc.

As with memory 206, 208, storage system 310 can be of any type of computerized storage capable of storing information accessible by one or more of the earbuds of the pair of earbuds 238, and computing devices 302, 34, 306, such as a hard-drive, memory card, ROM, RAM, DVD, CD-ROM, write-capable, and read-only memories. In addition, storage system 310 may include a distributed storage system where data is stored on a plurality of different storage devices which may be physically located at the same or different geographic locations. Storage system 310 may be connected to the computing devices via the 308 as shown in FIG. 3 and/or may be directly connected to any earbud of the pair of earbuds 238 and/or computing devices 302, 304, 306. Storage system 310 may store data such as location data and sensor data.

Example Methods

Figure 4:
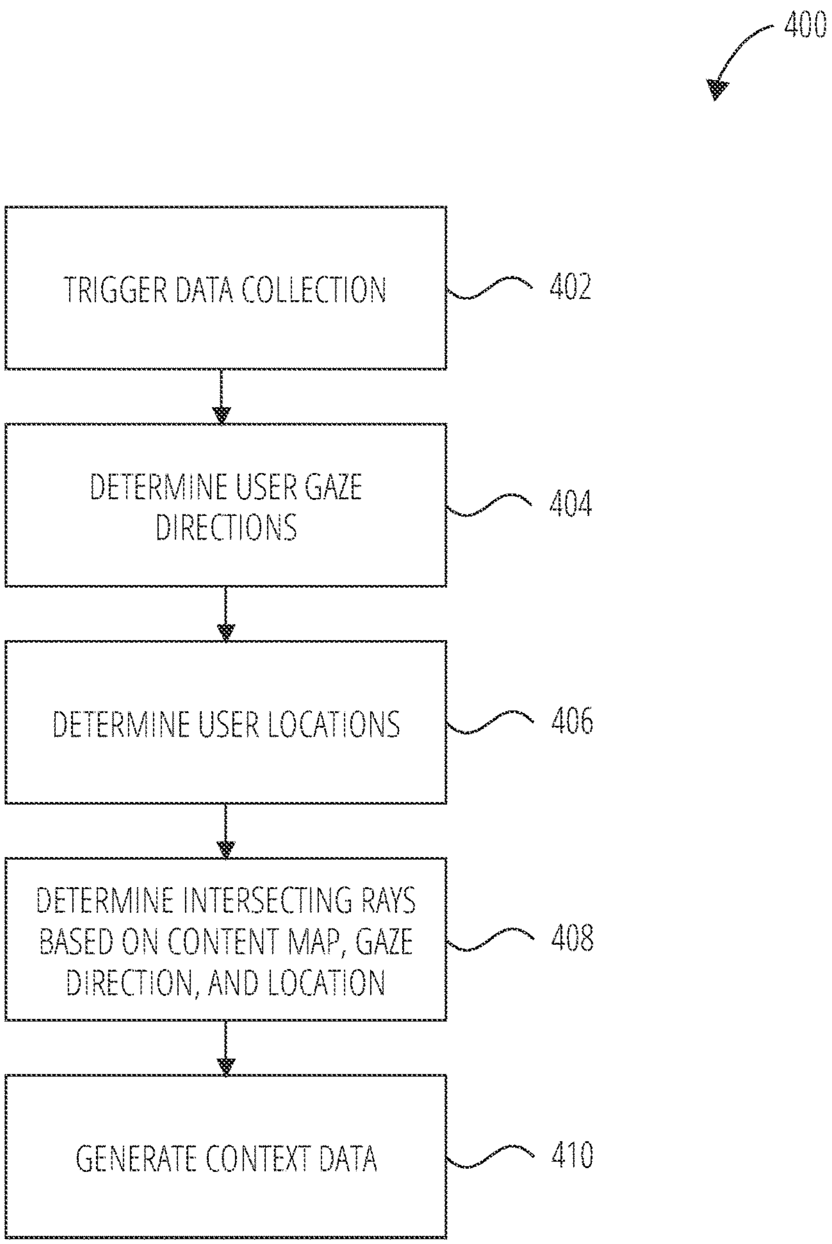
FIG. 4 is a flow diagram illustrating the method for generating context data by determining which products a user viewed during a shopping experience in accordance with aspects of the disclosure.

FIG. 4 illustrates a flow diagram 400 of a method for generating context data by determining the products a user, such as user 314, viewed when traveling through a store, such as store 102. Although the flow diagram 400 depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

Figure 5:
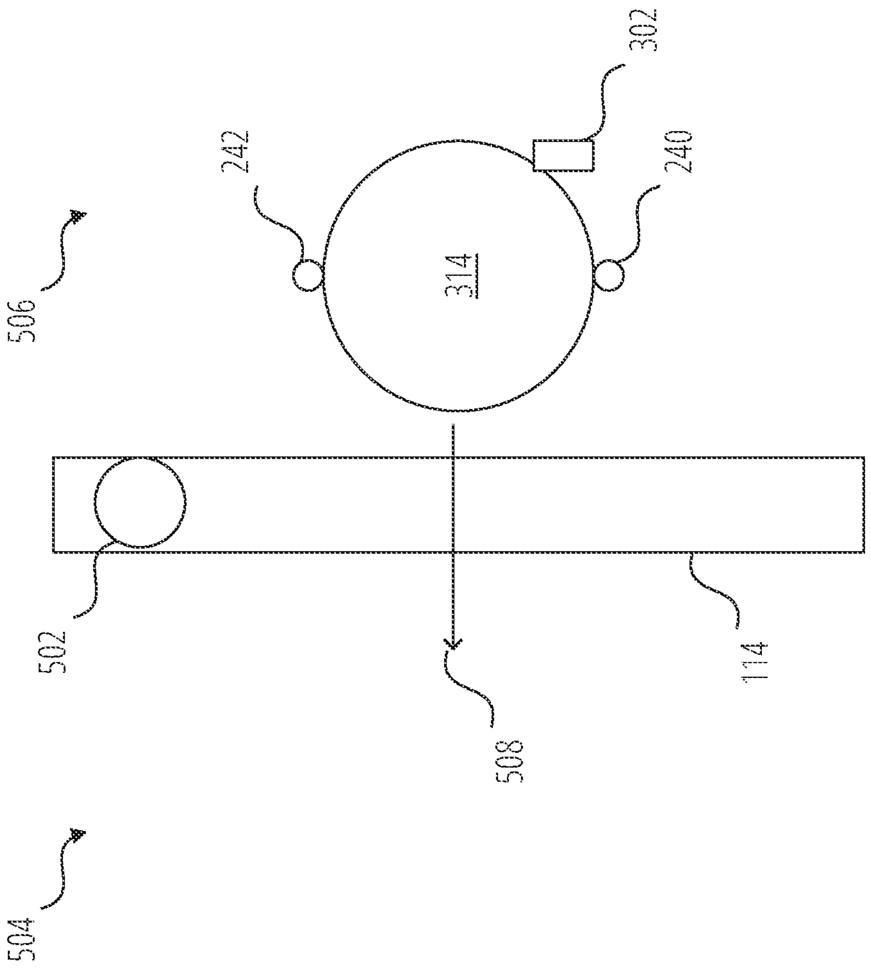
FIG. 5 illustrates a user entering a store in accordance with aspects of the disclosure.

The method may include triggering data collection when a user is entering, or approaching, a store, as illustrated by block 402. For example, and as illustrated in FIG. 5, doorway 114 of store 102 may have an initiation device 502 that may trigger data collection upon a user, such as user 314 entering a store. The initiation device 502 may be a Bluetooth device, an RFID tag, or another such device that can communicate or otherwise provide an indication to a computing device and/or earbud to begin data collection.

As illustrated in FIG. 5, user 314 may go from outside of store 506 to the inside of store 504 through doorway 114, as illustrated by arrow 508. As the user 314 passes through the doorway 114, the initiation device 502 may provide a signal or otherwise trigger data collection, including the collection of sensor data and/or location data. For example, the initiation device 502 may be an RFID tag that can be detected by a communication module, such as communication module 230 and/or communication module 232 in the left earbud 240 and right earbud 242, respectively, worn by user 314. Alternatively, or additionally, the communication module that detects the RFID tag may be within the user's device, such as user device 302 carried by user 314.

In yet another example, the initiation device 502 may be a Bluetooth device configured to detect communication modules within earbuds and/or user's devices, such as pair of earbuds 238 and user device 302. Upon detecting the communication module, the initiation device 502 may send a signal to the communication module to initiate the collection of sensor data and location data.

Upon a communication module receiving the signal from the initiation device 502 and/or the communication module detecting the initiation device 502, data collection may be initiated. For example, if a communication module within the pair of earbuds 238 receives a signal or detects the initiation device 502, the IMUs 226, 228 may begin collecting sensor data. The collection of sensor data may be controlled by processors 202, 204. In some instances, the pair of earbuds 238 may communicate with the user's device 302, indicating that data collection has or is going to begin. An application executing on the user device 302 may then begin the collection of location data from GPS and/or establish communication with the store's indoor navigation system to collect location data. Alternatively, or in addition, in instances where the earbuds contain GPS or other such hardware, the earbuds may collect the location data. Alternatively, or in addition, location data may be determined from the positional data within the sensor data. The application may be part of the operating system of the user device 302, a standalone application, and/or a web app. For instance, the application may be an application offered by the store the user is entering.

In another example, where the user device 302 receives a signal or otherwise detects the initiation device 502, the user device may send an initiation signal to the pair of earbuds 238. In response to the initiation signal, the pair of earbuds may begin collecting sensor data. As explained herein, the IMUs 226, 228 may begin to collect sensor data, including accelerometer and gyroscopic data from which a respective frame of reference and location for each earbud may be determined, as described herein. Data collection may continue for a part of a user's visit to a store or the entirety of the visit. Data collected during data collection may be timestamped.

Figure 6A:
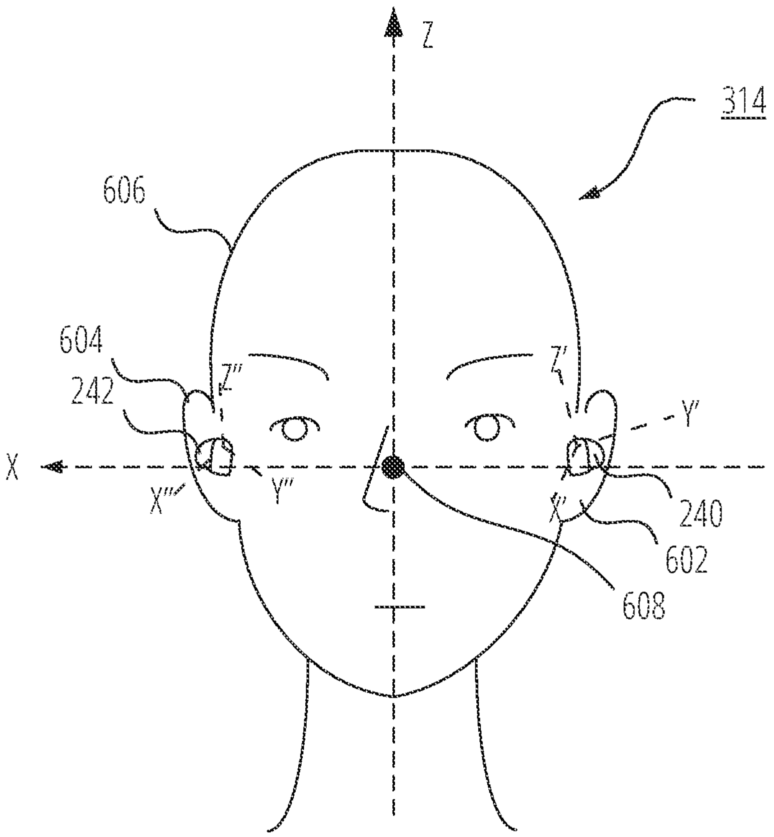
FIG. 6A is a pictorial diagram illustrating a front view of an example pair of earbuds worn by a same user in accordance with aspects of the disclosure
Figure 6B:
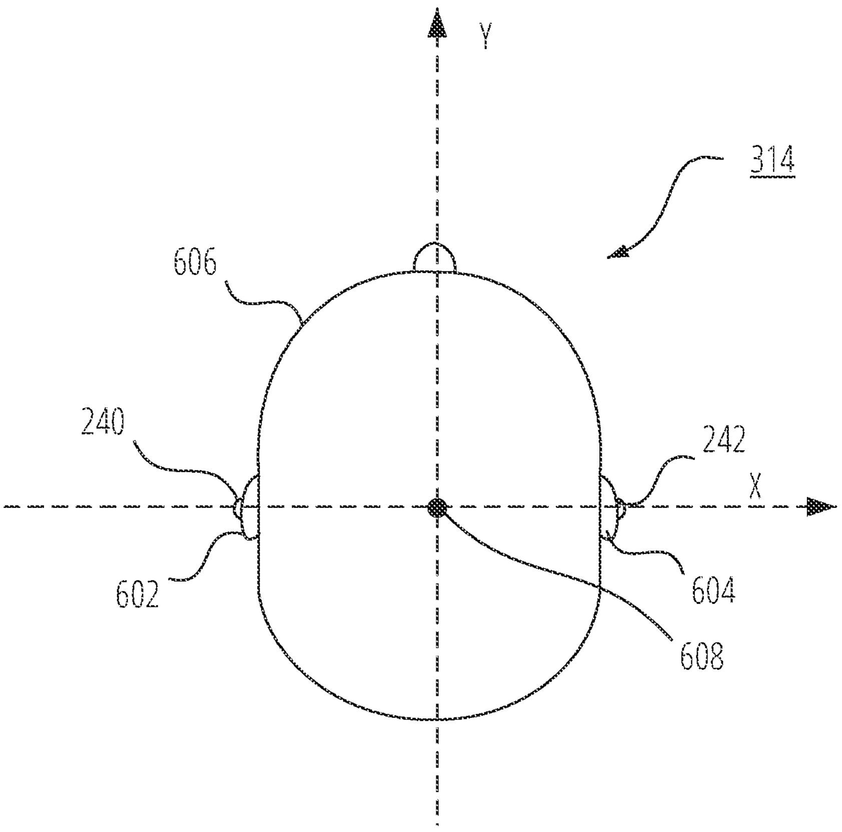
FIG. 6B is a pictorial diagram illustrating a top-down view of an example pair of earbuds worn by a same user in accordance with aspects of the disclosure

Once data collection begins, or after data collection is complete, the gaze direction of the user as they traverse or traversed the store may be determined using the sensor data, as illustrated by block 404 of FIG. 4. In this regard, and as shown in FIG. 6A and FIG. 6B, while being worn by the user 314, the left earbud 240 and the right earbud 242 are configured to have fixed positions with respect to the user's left ear 602 and right ear 604, respectively, as well as with respect to each other. As such, the left earbud 240 and the right earbud 242 may be considered as attached to a same rigid body—the user's head 606—and move along with the same rigid body. Motions of the user's user's head 606 may be defined with respect to a frame of the user's user's head 606. For example, the frame may be defined by various axes through the user's user's head 606, such as a vertical axis ("z-axis"), a first horizontal axis ("x-axis"), and a second horizontal axis ("y-axis"). The x-, y-, and/or z-axes may intersect at a point 608.

As shown in front view of the user 314 in FIG. 6A, the left earbud 240 and the right earbud 242 may each also have a respective frame (indicated by dash-dot lines). The frame for each of the left earbud 240 and the right earbud 242 may be defined by an IMU therein. For example, the frame may be defined by axes of a 3-axes accelerometer and/or axes of a 3-axes gyroscope. In some instances, the accelerometer and the gyroscope in an IMU may have the same set of axes such that both measure motion with respect to the same set of axes. For example as shown, the frame of the left earbud 240 may be defined by x'-, y'-, and z'-axes, and the frame of the right earbud 242 may be defined by x"-, y"-, and z"-axes. Further as shown, depending on how the left earbud 240 and right earbud 242 are being worn, and other factors such as ear anatomy, the frame of the left earbud 240 and the frame of the right earbud 242 may not align with each other, or with the frame of the user's head 606. However, movement of the pair of earbuds 238, including angular rotation and linear motion that may be detected by the gyroscopes and accelerometers, respectively, may be used to determine the orientation of the user's head 606, and thus, the user's gaze direction, which may be considered to align with the y-axis in FIG. 6B.

By beginning to analyze the user's sensor data upon entry into the store at time t=0, the user's gaze direction relative to the content map may be determined. In this regard, when an individual enters a store, they typically walk in a straight line and look straight ahead. Accordingly, the user's gaze direction and/or direction of travel as they enter the store will likely be perpendicular to the entryway. As the initial orientation of the user when they enter the store is known, the orientation of the content map, location data, and sensor data may be aligned. Accordingly, the user's gaze direction throughout the store may be determined relative to the content map for any time by tracking the gaze direction throughout the store from time t=0 to t=x, where x is time for which the user's gaze direction is being determined. The determination of the user's gaze direction may be performed by one or more processors of the pair of earbuds 238 and or a computing device, such as user device 302. In instances where a computing device performs the determination of the user's gaze direction, the sensor data may be transmitted from the pair of earbuds 238 to another computing device and/or storage system 310.

Once data collection begins, or after data collection is complete, the location of the user as they traverse or traversed the store may be determined using the location data, as illustrated by block 406 of FIG. 4. As described herein, the location data may correspond to data provided by a GPS, an indoor navigation system, or sensors, such as IMUs. As with determining the user's gaze direction, determining the location of the user throughout the store may be determined relative to the content map for any time. In instances where the location of the user is being determined with positional data, the user's location may be performed by tracking the user's location throughout the store from time t=0 to t=x, where x is time for which the user's location is being determined. The determination of the user's location may be performed by one or more processors of the pair of earbuds 238 and or a computing device, such as user device 302.

Although the foregoing examples describe determining the user's gaze direction and location at a single time, the user's gaze direction and location may be determined for any number of times. For instance, the user's gaze direction and location may be determined for every second, every fraction of a second, every few seconds, etc., the user is within the store. For example, the user's gaze direction and location may be determined for every second the user is in the store, starting from time t=0.

Figure 7:
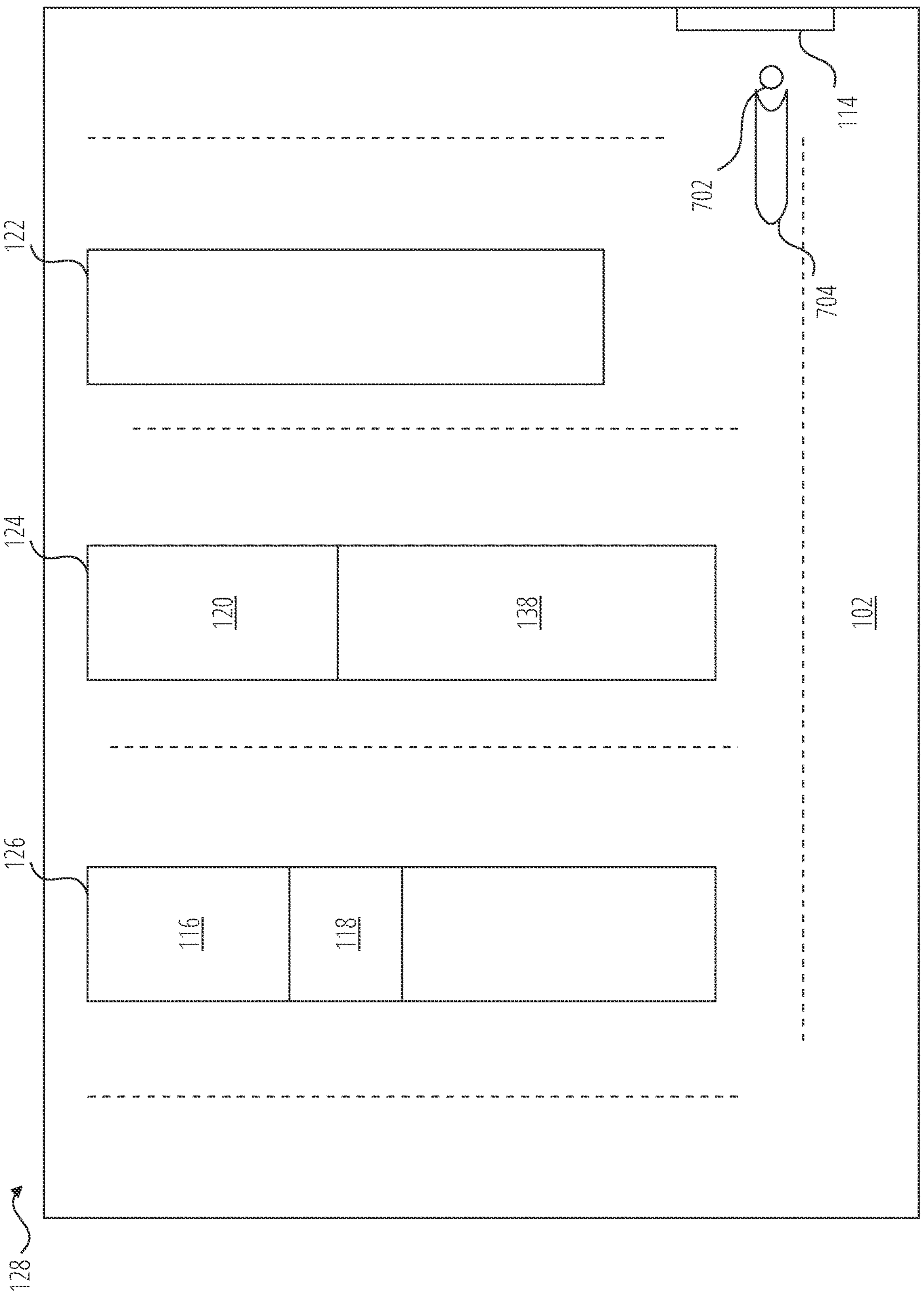
FIG. 7 illustrates a user location and ray corresponding to a gaze direction in accordance with aspects of the disclosure.

Based on the content map, gaze direction, and location of the user at a particular time, intersecting rays may be determined to indicate products viewed by the user, as shown in block 408 of FIG. 4. The determination of intersecting rays may be performed by a computing device, such as server 304 or user device 302. FIG. 7 illustrates the location of the user 314 and a ray in the direction of the gaze direction of user 314 at 1-0, overlaid on content map 128. As shown, the user's location is illustrated by point 702 and the ray 704 has a width to represent a user's viewing area when looking in the determined gaze direction. The ray 704 is perpendicular to the doorway 114. As further shown in FIG. 7, the ray in the user's gauze direction does not intersect with any product locations. Accordingly, at time 1=0 it may be determined that the user 314 is not looking at any products.

Figure 8:
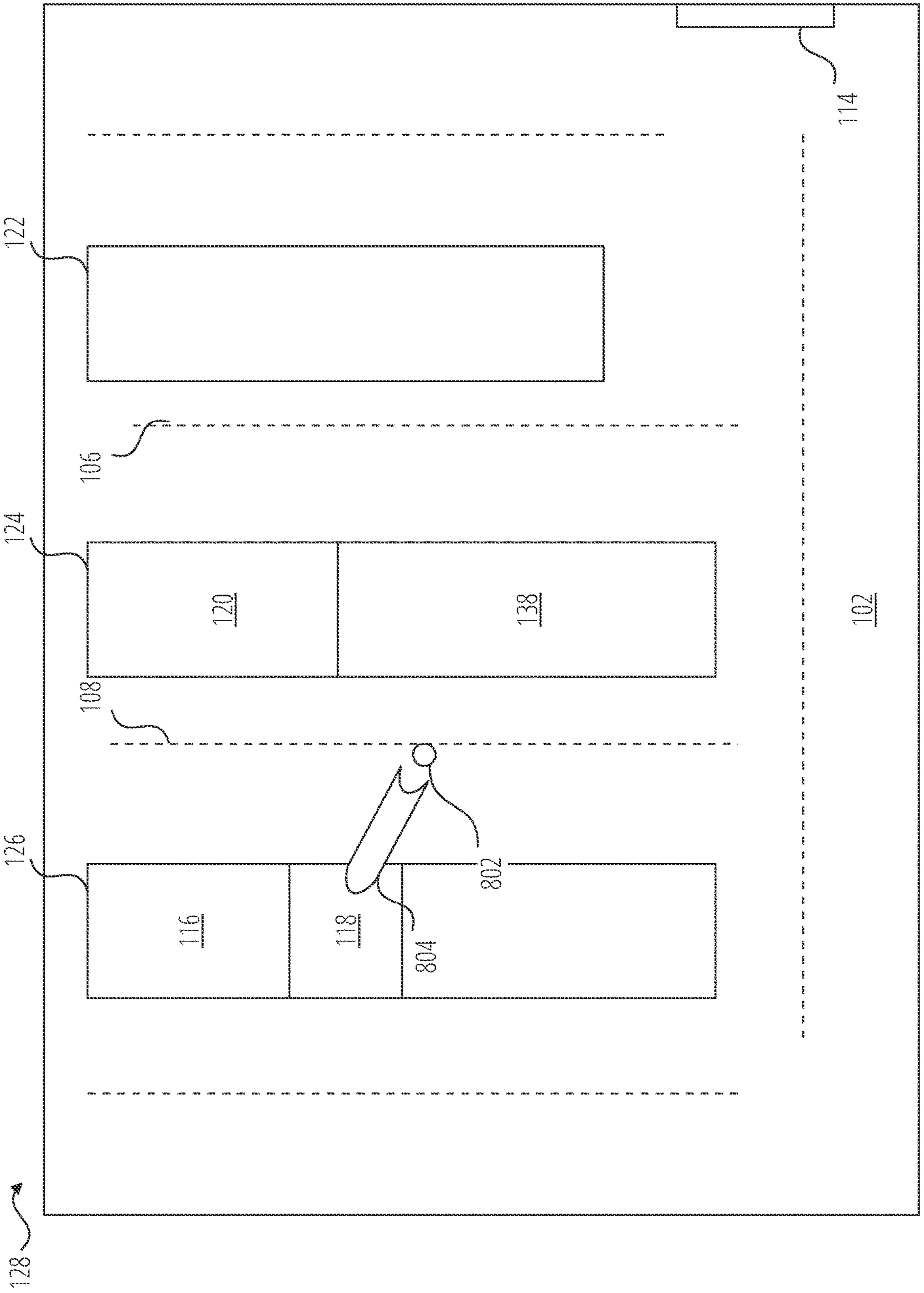
FIG. 8 illustrates another user location and ray corresponding to a gaze direction in accordance with aspects of the disclosure.

FIG. 8 illustrates the location and a ray in the gaze direction of user 314 at t=70, where 70 can be any value of time, such as seconds, minutes, etc. In this regard, at time t=70, user 314 is at location 802 which is between shelf 2 124 and shelf 3 126 in aisle 3 108. The ray 804 in the gaze direction of the user at time t=70 intersects with sub-product location 118 on shelf 3 126. Accordingly, at time t=70 the viewer may be considered to have viewed the product at sub-product location 118, which includes suits. In instances where a ray overlaps two product or sub-product locations at different distances, the closest product or sub-product location may be selected as the product or sub-product location being viewed by the user. For instance, if the user was positioned in aisle 2 106 and the ray corresponding to the user's gaze direction overlapped sub-product location 138 and sub-product location 118, sub-product location 138 may be considered the product/sub-product location being viewed.

In some instances, the amount of time the user viewed a product location or sub-product location may be determined. As illustrated by block 410 of FIG. 4, context data may be generated based on viewed products and, in some instances, the length of time the user viewed the products. In this regard, context data may include the products viewed by the user and the length of time the user viewed the products.

Referring again to FIG. 8, the ray 804 has a width corresponding to a user's viewing area. Based on where the ray intersects a product location or sub-product location may be indicative of whether the user is focused on a product at that location. However, for gaze directions having rays that overlap two product or sub-product locations or are directed to an edge of product or sub-product locations may not result in accurate results. To address this, a machine model may be trained using a value for the area where the ray intersects the product and sub-product locations as well as the amount of time the user maintains their gaze direction on that area to generate an estimation as to whether the user is viewing a product at that product or sub-production location. The value may be indicative of whether the ray is intersecting the edge or center of a product or sub-product location.

For example, a machine learning model, such as a neural network, may be trained to generate attention scores indicative of the likelihood a user is viewing a particular product or sub-product location based on the value and the duration the user viewed the product or sub-product locations.

Further to the descriptions above, a user may be provided with controls allowing the user to make an election as to both if and when systems, applications, programs, or features described herein may enable the collection of user information (e.g., information about a user's shopping experience, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for passively collecting context data, the method comprising:

receiving, by one or more processors, location data of a user as the user travels within a facility;

receiving, by the one or more processors, from one or more inertial measurement units (IMU) in each earbud of a pair of earbuds worn by the user, sensor data corresponding to an orientation of each respective earbud;

determining, by the one or more processors, based on the received sensor data, gaze directions of the user as the user travels within the facility;

determining, by the one or more processors, one or more products viewed by the user while traveling within the facility by comparing, using a content map of the facility, the gaze directions of the user to product locations storing products, wherein comparing the gaze directions of the user to the product locations comprises, for one or more of the gaze directions:

determining, from the location data, a location of the user when the gaze direction was determined; and determining whether a ray from the location of the user in the gaze direction intersects products of the product locations, wherein the one or more products are the products the rays intersects, and wherein the ray has a width representing the user's viewing area when looking in the determined gaze direction; and generating, by the one or more processors, the context data, wherein the context data comprises the one or more products.

2. The method of claim 1, wherein the location data includes GPS data, indoor navigation system data, and/or positional data contained within the sensor data.

3. The method of claim 1, wherein the product locations include sub-product locations.

4. The method of claim 1, wherein the sensor data from each earbud includes data captured by one or more accelerometers and gyroscopes.

5. The method of claim 1, further comprising receiving, by one or more processors, a signal from an initiation device, wherein the signal initiates collection of the sensor data by the pair of earbuds.

6. The method of claim 1, further comprising:

receiving, by the one or more processors, data from an RFID tag indicating the user has entered the facility; and initiating collection of the sensor data by the pair of earbuds.

7. The method of claim 1, wherein the context data comprises information of the one or more products and a length of time the user maintained the respective gaze direction to the one or more products.

8. The method of claim 1, wherein determining the one or more products viewed by the user comprises:

determining a duration the user maintained the gaze direction on an area where the ray intersects the product locations; and generating, using a machine learning model, an attention score based on the duration and a value representing the area, wherein the one or more products are determined based on the attention score.

9. A system comprising:

a pair of earbuds;

one or more processors; and a memory storing instructions that, when executed by the one or more processors, cause the one or more processors to:

receive location data of a user as the user travels within a facility;

receive, from each earbud in a pair of earbuds worn by the user, sensor data corresponding to an orientation of each respective earbud;

determine, based on the received sensor data, gaze directions of the user as the user travels within the facility;

determine, one or more products viewed by the user while traveling within the facility by comparing, using a content map of the facility, the gaze directions of the user to product locations storing products, wherein comparing the gaze directions of the user to product locations comprises, for one or more of the gaze directions:

determining, from the location data, a location of the user when the gaze direction was determined; and determining whether a rays from the location of the user in the gaze direction intersects products location of the product locations, wherein the one or more products are the products stored at product locations the rays intersects, and wherein the ray has a width representing the user's viewing area when looking in the determined gaze direction; and generate the context data, wherein the context data comprises the one or more products.

10. The system of claim 9, wherein the location data includes GPS data, indoor navigation system data, and/or positional data contained within the sensor data.

11. The system of claim 9, wherein the product locations include sub-product locations.

12. The system of claim 9, wherein the sensor data from each earbud includes data captured by one or more accelerometers and gyroscopes.

13. The system of claim 9, the system further comprising an initiation device, the initiation device configured to transmit a signal to the one or more processors, wherein the signal initiates collection of the sensor data by the pair of earbuds.

14. The system of claim 9, wherein the one or more processors are further configured to:

receive data from an RFID tag indicating the user has entered the facility; and initiating collection of the sensor data by the pair of earbuds.

15. The system of claim 9, wherein the context data comprises information of the one or more products and a length of time the user maintained the respective gaze direction to the one or more products.

16. The system of claim 9, wherein determining the one or more products viewed by the user comprises:

determining a duration the user maintained the gaze direction on an area where the ray intersects the product locations; and generating, using a machine learning model, an attention score based on the duration and a value representing the area, wherein the one or more products are determined based on the attention score.

* * * * *